(12) United States Patent
Mantell et al.

(10) Patent No.: US 10,518,471 B2
(45) Date of Patent: Dec. 31, 2019

(54) EXTRUDER ASSEMBLY FOR A THREE-DIMENSIONAL OBJECT PRINTER

(71) Applicant: Xerox Corporation, Norwalk, CT (US)

(72) Inventors: David A. Mantell, Rochester, NY (US); Peter J. Nystrom, Webster, NY (US); Christopher G. Lynn, Wolcott, NY (US)

(73) Assignee: Xerox Corporation, Norwalk, CT (US)

( * ) Notice: Subject to any disclaimer, the term of this patent is extended or adjusted under 35 U.S.C. 154(b) by 693 days.

(21) Appl. No.: 15/147,259

(22) Filed: May 5, 2016

(65) Prior Publication Data

US 2017/0320272 A1    Nov. 9, 2017

(51) Int. Cl.
| | | |
|---|---|---|
| *B29C 44/32* | (2006.01) | |
| *B29C 64/321* | (2017.01) | |
| *B29C 48/21* | (2019.01) | |
| *B29C 64/343* | (2017.01) | |
| B33Y 10/00 | (2015.01) | |
| B33Y 30/00 | (2015.01) | |
| B29L 9/00 | (2006.01) | |

(52) U.S. Cl.
CPC ............ *B29C 64/321* (2017.08); *B29C 48/21* (2019.02); *B29C 64/343* (2017.08); *B29L 2009/00* (2013.01); *B33Y 10/00* (2014.12); *B33Y 30/00* (2014.12)

(58) Field of Classification Search
None
See application file for complete search history.

(56) References Cited

U.S. PATENT DOCUMENTS

| | | | |
|---|---|---|---|
| 6,505,089 B1* | 1/2003 | Yang ................. | G05B 19/4099 |
| | | | 264/308 |
| 2002/0020945 A1 | 2/2002 | Cho et al. | |
| 2006/0158456 A1* | 7/2006 | Zinniel ................. | B33Y 30/00 |
| | | | 345/589 |
| 2009/0004380 A1 | 1/2009 | Hochsmann et al. | |
| 2014/0291886 A1* | 10/2014 | Mark ................... | B29C 64/118 |
| | | | 264/163 |
| 2015/0021830 A1 | 1/2015 | Yerazunis et al. | |
| 2015/0151343 A1* | 6/2015 | Strong ................. | B21C 23/005 |
| | | | 72/262 |
| 2015/0290860 A1 | 10/2015 | Shaw | |

FOREIGN PATENT DOCUMENTS

| | | |
|---|---|---|
| EP | 1 951 505 B1 | 8/2008 |
| FR | 2684590 A1 | 6/1993 |

\* cited by examiner

*Primary Examiner* — Monica A Huson
*Assistant Examiner* — Kelsey C Grace
(74) *Attorney, Agent, or Firm* — Maginot, Moore & Beck LLP

(57) ABSTRACT

An extruder assembly for a three-dimensional object has an extrusion slot to enable faster three-dimensional object printing with greater precision. The extruder assembly includes an extruder body having an extrusion slot to enable a continuous filament of material to be extruded through the extrusion slot and at least one actuator operatively connected to the extruder body. The at least one actuator is configured to translate the extruder body in a horizontal plane and rotate the extruder body about a rotational axis.

8 Claims, 9 Drawing Sheets

EXTRUDER ASSEMBLY FOR A THREE-DIMENSIONAL OBJECT PRINTER

TECHNICAL FIELD

The system and method disclosed in this document relate to printers that produce three-dimensional objects and, more particularly, to extruder assemblies for such printers.

BACKGROUND

Digital three-dimensional manufacturing, also known as digital additive manufacturing, is a process of making a three-dimensional solid object of virtually any shape from a digital model. Three-dimensional object printing is an additive process in which one or more extruder or ejector assemblies form successive layers of material on a substrate in different shapes. In some conventional three-dimensional object printers, the extruders are similar to printheads in document printers, as they include an array of extruders that emit a continuous stream of material to form layers, rather than an array of ejectors that eject drops of material to form layers.

In other known three-dimensional object printers, the extruder assembly includes a single nozzle configured to extrude the build material to form layers for production of a printed object. The nozzle is generally configured as a small circular hole that emits a continuous filament of build material. The filaments are laid down layer by layer to form the three-dimensional part. In such an extruder assembly, the printed object should be formed quickly and accurately. The diameter of the nozzle determines both the minimum resolution of the part and the speed at which the object can be formed. For example, a larger diameter nozzle can form the object more quickly, but has reduced resolution, while a smaller diameter nozzle can form smaller details, but the product requires more time to produce. Thus, in conventional three-dimensional object printers, the size of the nozzle presents a trade-off between build speed and build resolution.

Accordingly, improvements in systems and methods for forming three-dimensional objects with printers that include extruder assemblies so the objects have greater detail and reduced production time would be beneficial.

SUMMARY

In one embodiment, an extruder assembly for a three-dimensional object has an extrusion slot to enable faster three-dimensional object printing with greater precision. The printing system includes an extruder body having an extrusion slot to enable a continuous filament of material to be extruded through the extrusion slot and at least one actuator operatively connected to the extruder body. The at least one actuator is configured to translate the extruder body in a horizontal plane and rotate the extruder body about a rotational axis.

In another embodiment, a method of forming a three-dimensional build object enables faster three-dimensional object printing with greater precision. The method comprises extruding build material through an extrusion slot of an extruder body of an extruder assembly, translationally moving the extruder body in a horizontal plane with the at least one actuator while extruding build material so as to form a continuous ribbon of build material, and rotating the extruder body about a rotational axis with the at least one actuator while extruding the build material.

In yet another embodiment according to the disclosure, an extruder assembly for a three-dimensional object printing system has an extrusion slot and a shutter body that enables the extrusion area of the extrusion slot to be adjusted for better three-dimensional object printing accuracy and faster build times. The printing system includes an extruder body, at least one first actuator, at least one shutter body, and a second actuator. The extruder body has an extrusion slot to enable a continuous filament of material to be extruded through the extrusion slot. The at least one first actuator is operatively connected to the extruder and is configured to translate the extruder body in a horizontal plane. The second actuator is operatively connected to the at least one shutter body and is configured to move the at least one shutter body selectively over the extrusion slot to close a first portion of the extrusion slot and reduce a width of the filament extruded through the extrusion slot.

BRIEF DESCRIPTION OF THE DRAWINGS

The foregoing aspects and other features of a printer having extruders and a method for operating a printer having extruders are explained in the following description, taken in connection with the accompanying drawings.

DETAILED DESCRIPTION

Figure 1:
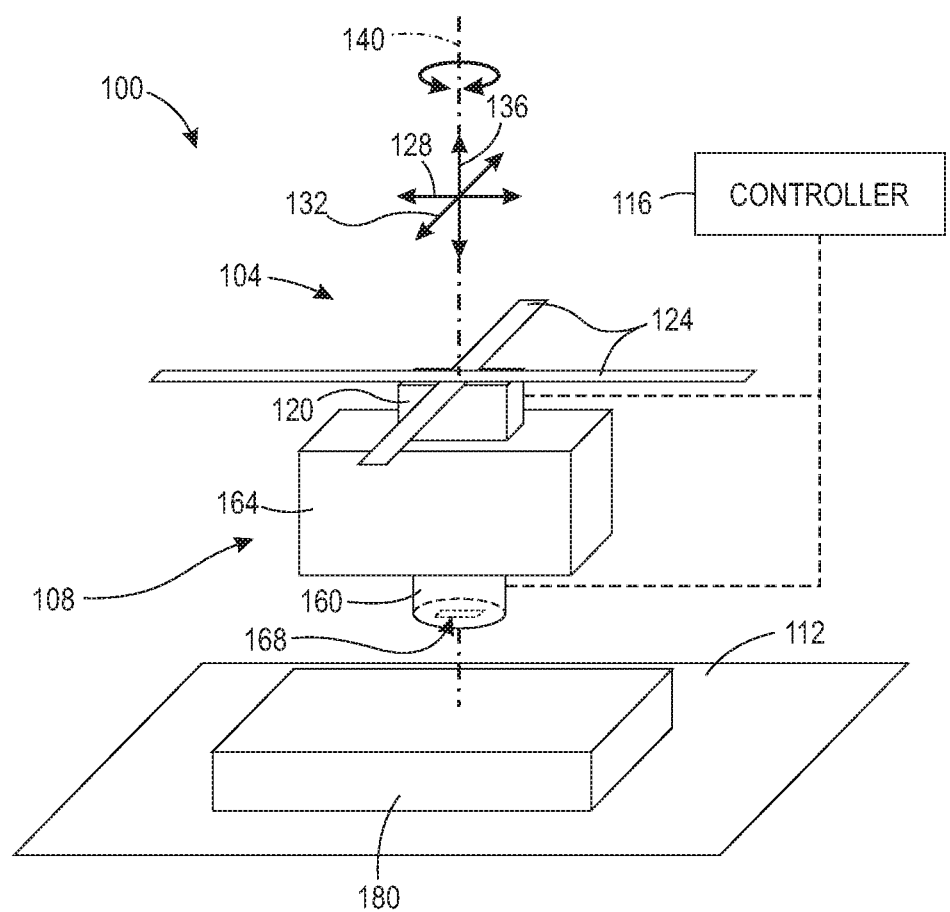
FIG. 1 is a schematic illustration of a three-dimensional object printer having an extruder assembly with an extrusion slot.

For a general understanding of the environment for the system and method disclosed herein as well as the details for the system and method, reference is made to the drawings. In the drawings, like reference numerals have been used throughout to designate like elements.

FIG. 1 illustrates a three-dimensional object printer 100. The three-dimensional object printer 100 includes an actuator assembly 104, an extruder assembly 108, a platen 112, and a controller 116. The actuator assembly 104 includes at least one actuator 120 and a pair of rails 124 attached to a support frame (not shown). The rails 124 are configured to support the actuator 120 and the extruder assembly 108 to enable the actuator 120 to translate the extruder assembly 108 along an x-axis 128, a y-axis 132, and a z-axis 136, and rotate the extruder assembly 108 about a rotational axis 140, which is parallel to the z-axis 136 in the illustrated embodiment.

Figure 18:
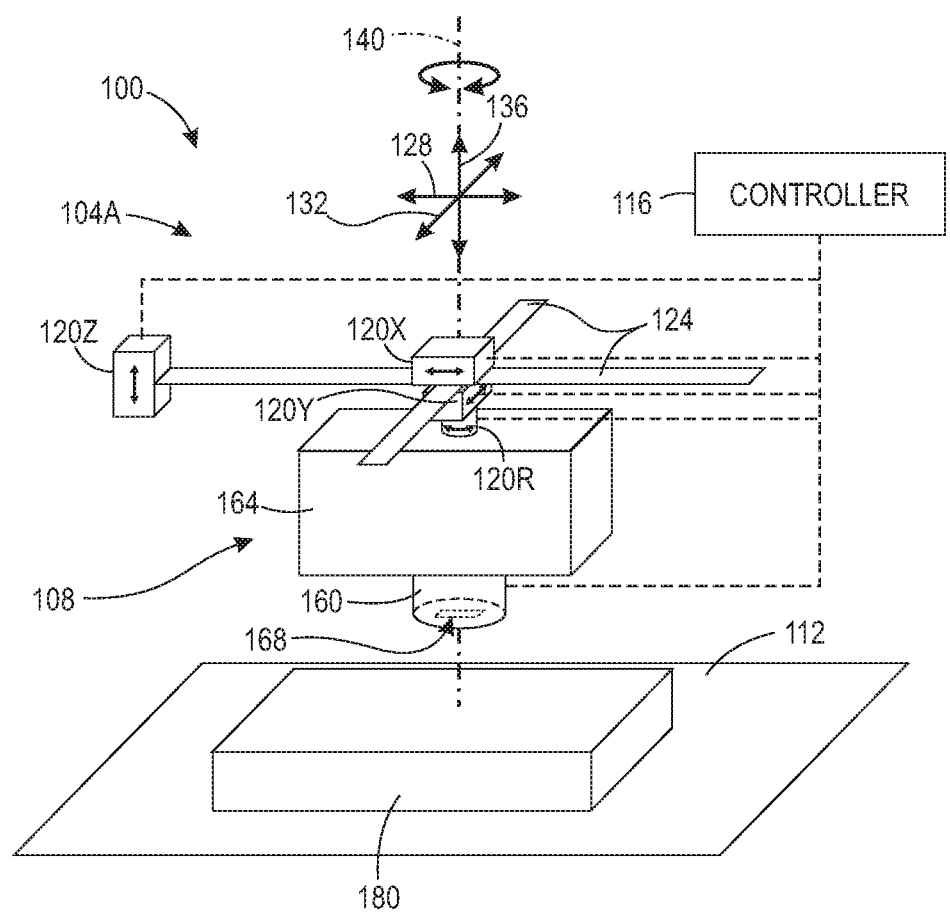
FIG. 18 is a schematic illustration of a three-dimensional object printer having an extruder assembly with an extrusion slot and including a separate actuator configured to move the extruder body in each of the x-, y-, z-, and rotational directions.

In the embodiment of FIG. 1, the actuator assembly 104 includes a single actuator 120 configured to translate the extruder assembly 108 in the x-, y-, and z-axes 128, 132, 136, respectively, and to rotate the actuator about the rotational axis 140. In another embodiment, the actuator assembly 104 includes a first actuator configured to move the extruder assembly 108 in the x-, y-, and z-axes 128, 132, 136, and a second actuator configured to rotate the extruder assembly 108 about the rotational axis 140. In yet another embodiment, illustrated in FIG. 18, the actuator assembly 104A includes a first actuator 120X configured to move the extruder body 164 in the x-direction 128, a second actuator 120Y configured to move the extruder body 164 in the y-direction 132, a third actuator 120Z configured to move the extruder body 164 in the z-direction 136, and a fourth actuator 120R configured to rotate the extruder body 164 about the rotational axis 140.

Referring back to FIG. 1, the extruder assembly 108 includes an extruder body 160 and a reservoir 164, which is configured to store a quantity of build material. An extrusion slot 168 (not shown to scale in the view of FIG. 1) is defined at the bottom of the extruder body 160. The extrusion slot 168 is operatively connected to the reservoir 164 and is configured to extrude build material received from the reservoir 164 to form a build object 180 on the platen 112. In one embodiment, the length of the extrusion slot 168 is between approximately 0.75 mm and approximately 6.4 mm and the width of the extrusion slot is between approximately 0.2 mm and approximately 0.5 mm. In another specific embodiment, the length of the extrusion slot 168 is approximately 1.2 mm and the width of the extrusion slot is approximately 0.3 mm. In some embodiments, the extrusion slot 168 is configured to be parallel to the plane of the surface of the platen 112 and the rotation about axis 140 maintains the slot in a parallel orientation to the surface of the platen. The rotation in some situations is adjusted with reference to the direction of motion of the extruder based on the desired size of the extruded ribbon.

Figure 2:
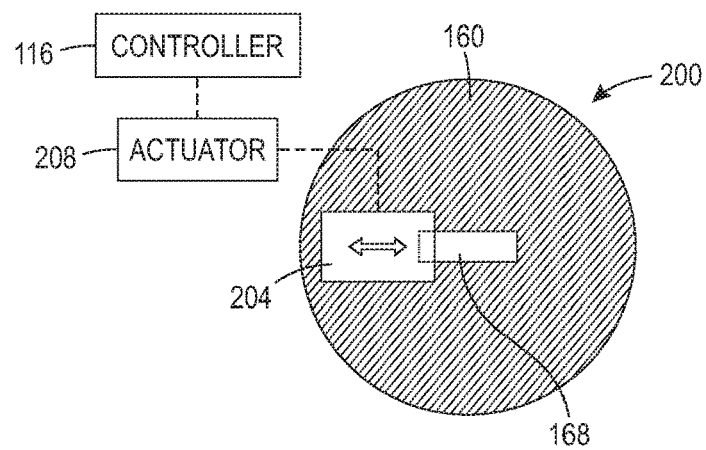
FIG. 2 illustrates a top partial cutaway view of a shutter system for the 3D object printer of FIG. 1 having a linearly moving shutter body configured to close at least a portion of the extrusion slot.

In some embodiments, the extruder body 160 includes a shutter system for closing off the extrusion slot or a portion thereof. Various shutter systems 200, 220, 240, 260, 280 for use in the extruder body 160 are illustrated in FIGS. 2-9. FIG. 2 illustrates a shutter system 200 having a flat shutter body 204. The flat shutter body 204 is operatively connected to an actuator 208, which is configured to slide the flat shutter body 204 linearly across the slot 168 to close a portion of the slot. The actuator 208 is operatively connected to the controller 116, which, as discussed in detail below, is configured to operate the actuator 208 to set the position of the flat shutter body 204 based on the desired size of the extruded ribbon.

Figure 3:
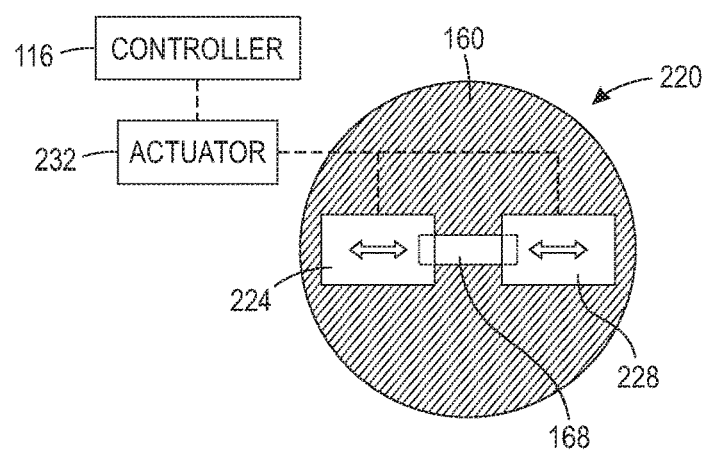
FIG. 3 illustrates a top partial cutaway view of a shutter system for the 3D object printer of FIG. 1 having two linearly moving shutter bodies, each of which is configured to close a portion of the extrusion slot.

Another embodiment of a shutter system 220 is illustrated in FIG. 3. The embodiment of FIG. 3 is similar to the embodiment of FIG. 2, with the exception that the shutter system 220 includes two flat shutter bodies 224, 228, each of which is operatively connected to the actuator 232. The actuator 232 is operatively connected to the controller 116, which is configured to operate the actuator 232 to set the position of each flat shutter body 224, 228. In one embodiment, the actuator 232 is configured to move each shutter body 224, 228 independently of one another to close different portions of the slot 168 on each side of the slot 168. In another embodiment, the actuator 232 is configured to move the shutter bodies together, but in opposite directions, to close the same portion of the slot 168 on each side of the slot 168.

Figure 4:
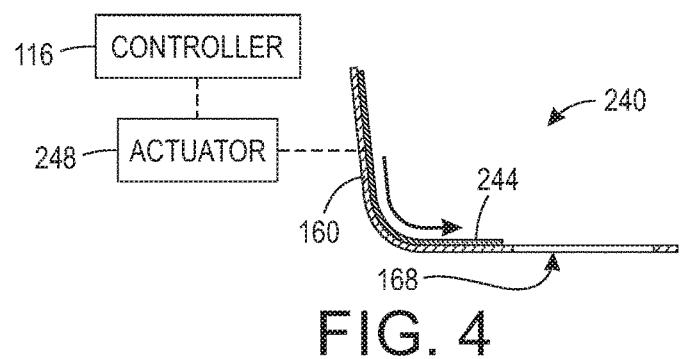
FIG. 4 illustrates a side partial cross-sectional view of an extruder body for the 3D object printer of FIG. 1 having a shutter system with a flexible linearly moving shutter bodies configured to close a portion of the extrusion slot.

FIG. 4 illustrates another embodiment of a shutter system 240 for use in the extruder body 160 of FIG. 1. The shutter system 240 includes a flexible shutter body 244, which is operatively connected to an actuator 248. The flexible shutter body 244 generally conforms to the bottom and side walls of the extruder body 160. The actuator 248 is operatively connected to the controller 116, which is configured to operate the actuator 248 to move the shutter body 244 along the side and bottom walls of the extruder body 160 to cover a portion of the slot 168.

The embodiment illustrated in FIG. 4 shows a shutter body 244 on one side of the slot. However, the reader should appreciate that, in some embodiments, the shutter system 240 includes a second shutter body operatively connected to the actuator 248 on the opposite side of the slot 168 to close a portion of the opposite side of the slot 168 in a similar manner to the embodiment of FIG. 3.

Figure 5:
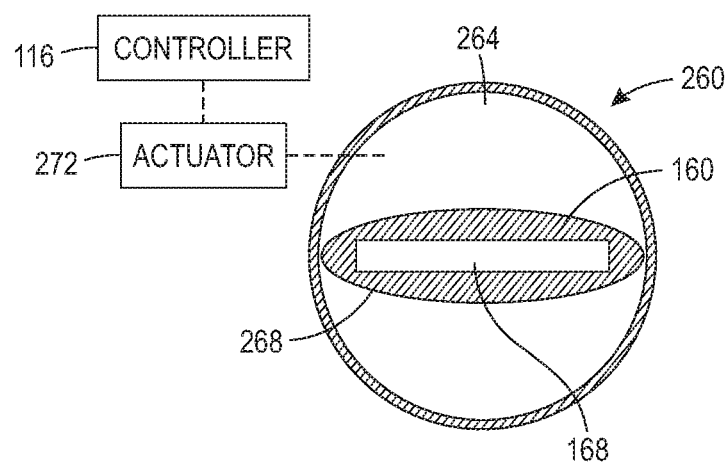
FIG. 5 illustrates a top partial cutaway view of a shutter system for the 3D object printer of FIG. 1 having a shutter body that is rotatable about a pivot axis to close a portion of the extrusion slot with the shutter body in an open position.
Figure 6:
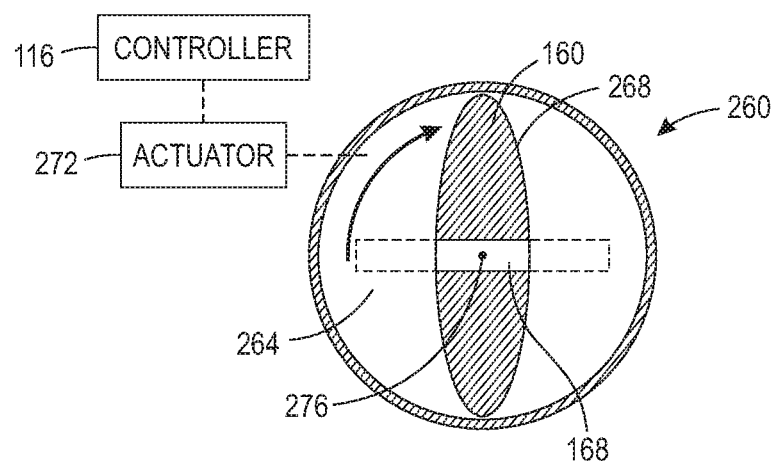
FIG. 6 illustrates a top partial cutaway view of the shutter system of FIG. 5 with the shutter body in a closed position.

FIG. 5 and FIG. 6 illustrate another shutter system 260 for use in the extruder body 160 of FIG. 1. The shutter system 260 includes a round shutter body 264 defining a central opening 268. In the illustrated embodiment, the central opening 268 is oval-shaped, though other desired shapes, for example rectangular, trapezoidal, or triangular, may be used in other embodiments. The shutter body 264 is operatively connected to an actuator 272, which is configured to rotate the shutter body. The actuator 272 is operatively connected to the controller 116, and the controller 116 is configured to operate the actuator 272 to rotate the shutter body 264 about a pivot axis 276 to block at least a portion of the slot 168 with the shutter body 264, as illustrated in FIG. 6.

Figure 7:
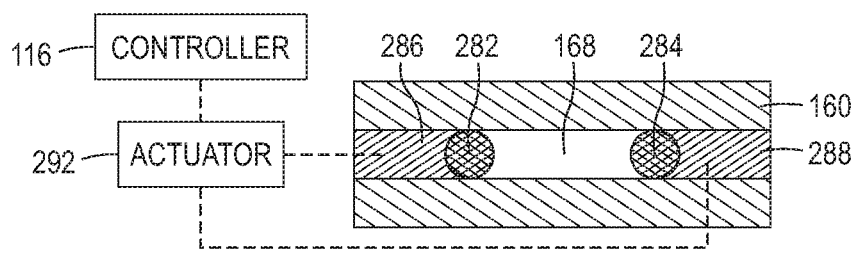
FIG. 7 illustrates a top partial cutaway view of a shutter system for the 3D object printer of FIG. 1 having two shutter bodies, each moved by a collet member to close a portion of the extrusion slot.
Figure 8:
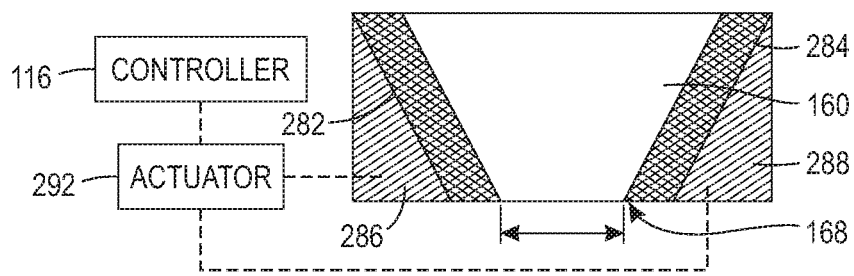
FIG. 8 illustrates a side partial cross-sectional view of the shutter system of FIG. 7 with shutter bodies not blocking the extrusion slot.
Figure 9:
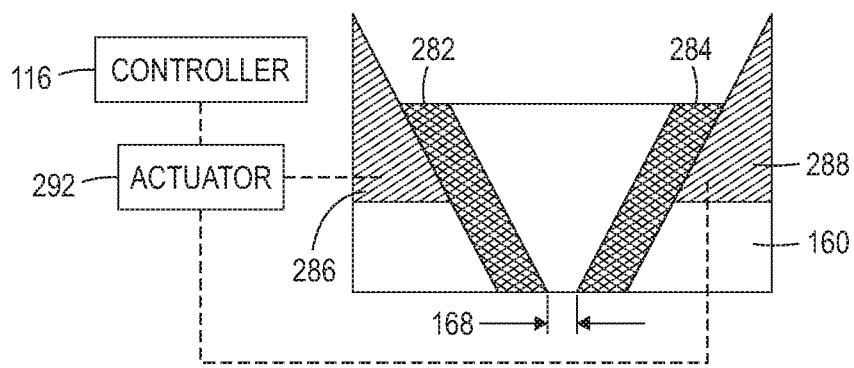
FIG. 9 illustrates a side partial cross-sectional view of the shutter system of FIG. 8 with the shutter bodies each blocking a portion of the extrusion slot.

FIGS. 7-9 illustrate another embodiment of a shutter system 280 for use in the extruder body 160 of FIG. 1. The shutter system 280 includes two shutter bodies 282, 284 and two wedge-shaped collet members 286, 288. Each wedge-shaped collet member is operatively connected to an actuator 292. As seen in the vertical cross-sectional views of FIG. 8 and FIG. 9, the shutter bodies 282, 284 are pins that rest on an oblique surface of the collet members 286, 288.

The actuator 292 is operatively connected to the controller 116, which operates the actuator 292 to move the collet members 286, 288 vertically. The upward and downward movement of the collet members 286, 288 causes the oblique surfaces of the collet members 286, 288 to interact with the corresponding shutter bodies 282, 284 to move the shutter bodies 282, 284 horizontally. Accordingly, as the collet members 286, 288 move upwardly, shown in FIG. 9, shutter bodies 282, 284 move towards one another, closing a portion of the slot 168. In the illustrated embodiment, the actuator 292 is operatively connected to both collet members 286, 288. However, in another embodiment, the actuator 292 is connected to only one of the collet members 286, 288, and the collet members 286, 288 are connected to one another so as to move together vertically.

Figure 10:
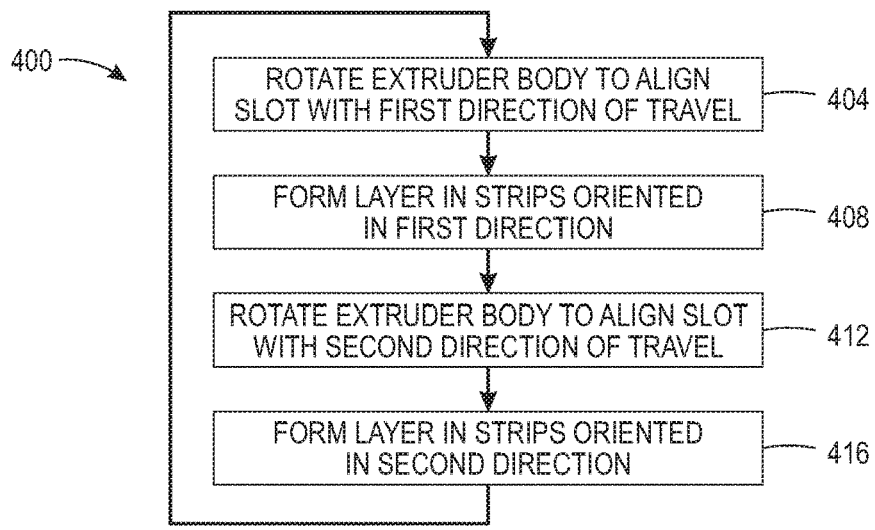
FIG. 10 illustrates a method of operating the 3D object printer of FIG. 1 to produce a build object.

FIG. 10 illustrates one process 400 used to operate the three-dimensional object printer 100 to extrude build material to form a build object 180. Statements that the process is performing some task or function refers to a controller or general purpose processor executing programmed instructions stored in non-transitory computer readable storage media operatively connected to the controller or processor to manipulate data and operate one or more components in the system to perform the task or function. The controller 116 of the three-dimensional object printer 100 noted above can be configured with components and programmed instructions to provide a controller or processor that performs the process 400. Alternatively, the controller can be implemented with more than one processor and associated circuitry and components, each of which is configured to form one or more tasks or functions described herein.

Figure 11:
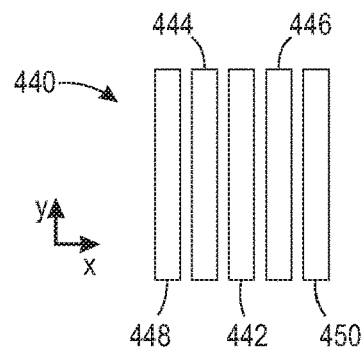
FIG. 11 illustrates a top view of a first layer produced by the 3D object printer of FIG. 1 according to the method of FIG. 10.
Figure 12:
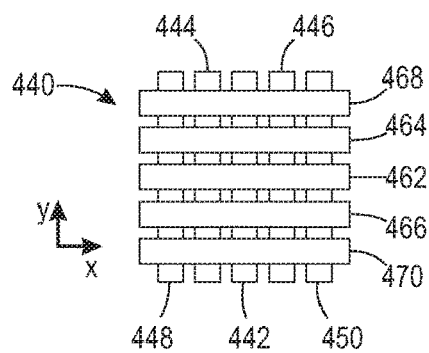
FIG. 12 illustrates a top view of the first layer of FIG. 11 and a second layer produced by the 3D object printer of FIG. 1 according to the method of FIG. 10.

With reference to FIGS. 10-12, the process 400 begins with the controller 116 operating the actuator 120 to rotate the extruder body 160 to align the width of the slot with the direction of travel for the first layer 440 (FIG. 11) (block 404). In the embodiment illustrated in FIG. 11, for example, the first direction is in the y-direction. In some embodiments, the controller 116 determines the desired direction of travel based upon the digital model of the build object. The controller 116 then operates the actuator 120 to translate the extruder body 160 in the direction of travel while extruding material from the slot 168 to extrude strips 442, 444, 446, 448, 450 of build material to form the first layer 440 (block 408). In one particular embodiment, the actuator 120 moves the extruder body 160 at a speed between approximately 5000 mm/min and 8000 mm/min during the extrusion processes. In another particular embodiment, the actuator moves the extruder body 160 at a speed of approximately 6000 mm/min during the extrusion processes.

In some embodiments of the three-dimensional object printer, the controller 116 is configured to operate the actuator 120 and extruder assembly 108 to produce the strips 442-450 by forming the center strip 442 first, and then forming the adjacent strips 444, 446, and finally forming the outer strips 448, 450 to improve adhesion between the strips 442-450 and thus improve the structural strength of the layer. In other embodiments, the layers 442-450 are formed from left-to-right or right-to-left to increase layer forming speed. In some embodiments, the strips 442-450 have different widths from one another. For example, the outside strips 448, 450 may have a width that is half the width of the inner strips 442, 444, 446.

Once the first layer 440 is complete, the controller 116 operates the actuator 120 to rotate the extruder body 160 to align with the second direction (block 412). In the illustrated embodiment, the second direction is aligned with the x-direction, orthogonal to the first direction. However, the reader should appreciate that the angle between the first and second directions can be other desired angles depending on the characteristics of the build object. The controller 116 then operates the actuator 120 to translate the extruder body 160 while extruding material from the slot 168 to extrude strips 462, 464, 466, 468, 470 of build material, which form the second layer (block 416).

If additional layers remain to be printed, the controller 116 may operate the actuator 120 to rotate the extruder body 160 to align with a third direction and form another layer in the third direction, or the controller 116 may operate the actuator 120 to repeat the processing of block 400 to produce additional layers in the first and second directions. While FIGS. 11 and 12 illustrate the strips 442-450, 462-470 as being separated from one another to clearly show the strips 442-450, 462-470 of the different layers 440, 460, respectively, the reader should appreciate that the strips 442-450, 462-470 are typically formed adjacent to one another so as to form a continuous layer of material.

Typically, the build object is formed of irregular layers, not the simple rectangular layers illustrated in FIGS. 11-12. These irregular layers typically include features that cannot be formed with the strips illustrated above. Thus, detail formation is required for those details that cannot be formed in the strips. The detail formation is typically performed immediately before, immediately after, or, in some instances, during the extrusion of the strips that form the majority of the layer (blocks 408 and 416).

Figure 13:
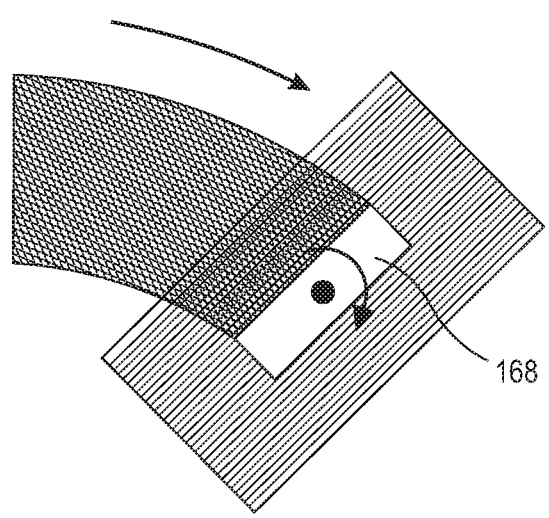
FIG. 13 illustrates a top partial schematic view of the extruder body of FIG. 1 simultaneously translating and rotating so as to form a curved feature.
Figure 14:
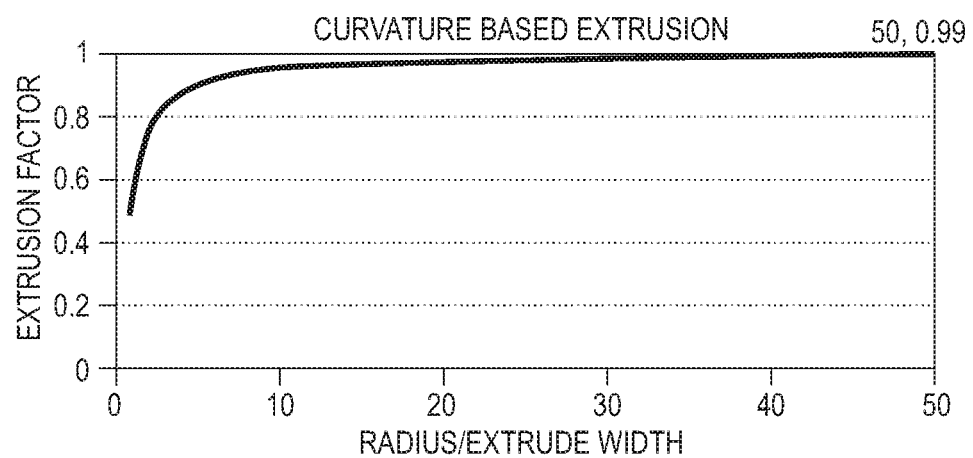
FIG. 14 illustrates a graph of extrusion factor against the ratio of radius to extrusion width for the production of curved features using the extrusion slot of FIG. 1.

One example of details that cannot be formed with the strips are curved shapes. In order to form curved details, the controller 116 is configured to operate the actuator 120, or, in embodiments having separate translational and rotational actuators, both the translational and rotational actuators, to rotate and translate the extruder body 160 at the same time (FIG. 13). As the extruder body 160 and the slot 168 rotate and translate, the outer edge of the slot 168 defines the outer edge of the curve, while the inner edge of the slot 168 forms the inner edge of the curve. Since the outside edge of the extrusion slot 168 travels a greater distance than the inside edge of the slot 168, an adjustment is required to the extrusion to account for the different travel distances of the inner and outer edges. In particular, when the radius of the curve is relatively small compared to the width of the slot 168, the quantity of build material extruded must be adjusted. As an example, extruding a small circle having a radius equal to the width of the slot (r) extrudes an area equal to $\pi r^2$, while the outside edge travels a linear distance of $2\pi r$. Thus, the rate of extrusion should be proportional to $\pi r^2/(2\pi r)$, or r/2. On the other hand, for a very large radius circle (R), the difference between the distances traveled by the inner and outer edges of the extrusion slot 168 are minimal, and the extrusion rate is proportional to the area printed ($2\pi rR$) divided by the path length ($2\pi R$), which is equal to r, or the slot width in this example. FIG. 14 illustrates a curve of the extrusion factor plotted against the ratio of the radius to extrusion width, or slot width.

Figure 15:
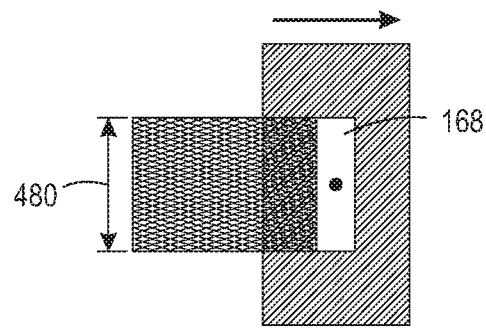
FIG. 15 illustrates a top partial schematic view of the extruder body of FIG. 1 moving with the long edge of the slot perpendicular to the direction of travel.
Figure 16:
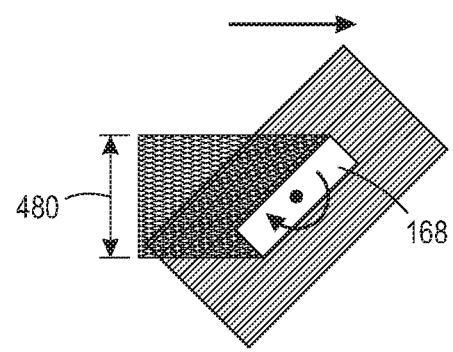
FIG. 16 illustrates a top partial schematic view of the extruder body of FIG. 1 moving with the long edge of the slot at a 45 degree angle relative to the direction of travel.
Figure 17:
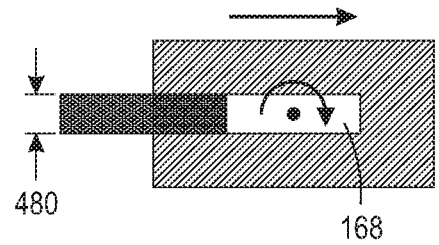
FIG. 17 illustrates a partial schematic top view of the extruder body of FIG. 1 moving with the long edge of the slot parallel to the direction of travel.

In some embodiments, certain details are formed by the controller 116 operating the actuator 120 to rotate the extruder body 160 to an angle relative to the direction of travel, reducing the effective width 480 of the extruded filament in the direction of travel, as illustrated in FIGS. 14-16. For example, as illustrated in FIG. 16, the width 480 of the extruded ribbon perpendicular to the direction of travel is slightly reduced as the extruder body 160 is rotated 45 degrees. When the extruder body 160 is rotated such that the long dimension of the slot 168 is parallel to the direction of travel, the extrusion width 480 is reduced to the minimum dimension of the slot 168, as illustrated in FIG. 17.

In embodiments of the three-dimensional object printing system having a shutter system 200, 220, 240, 260, 280 described above, the controller 216 is configured to operate the actuator 208, 232, 248, 272, 292 to reduce the width of the ribbon to form certain details. The controller 216 operates the actuator 208, 232, 248, 272, 292 to move the associated shutter member or members such that the shutter members cover a portion of the slot 168 and reduce the width of the ribbon or filament of build material extruded. With the extrusion width reduced, the controller 216 operates the actuator 120 to translate, rotate, or both translate and rotate the extruder body 160 to form details of the build object that are smaller than the size of the slot 168. In some embodiments, the controller 216 operates both the translational/rotational actuator 120 and the shutter actuator 208, 232, 248, 272, 292 at the same time to form details, for example to form a triangle or trapezoidal shaped detail. In further embodiments, the controller 116 is configured to operate the associated actuator 208, 232, 248, 272, 292 to cover the entire slot 168, thereby stopping the extrusion and reducing undesired extrusion while the extruder body 160 is moved, which is known as "weeping."

These techniques enabled by the embodiments of the three-dimensional printing system 100 permit the layers of the build object to be formed quickly by orienting the slot 168 with the direction of travel and extruding wide ribbons of build material. Moreover, layers that are adjacent in the z-direction may be formed with the direction of travel at angles to one another, thereby increasing the overall structural strength of the build object. Furthermore, while extrusion through the slot 168 enables faster formation of a build object than through a conventional nozzle, the shutter system 200, 220, 240, 260, 280 and the rotation of the extruder body 160 enable the three-dimensional object printing system 100 to form curves and small details that cannot be produced with known three-dimensional object printers having a slotted extruder.

Figure 19:
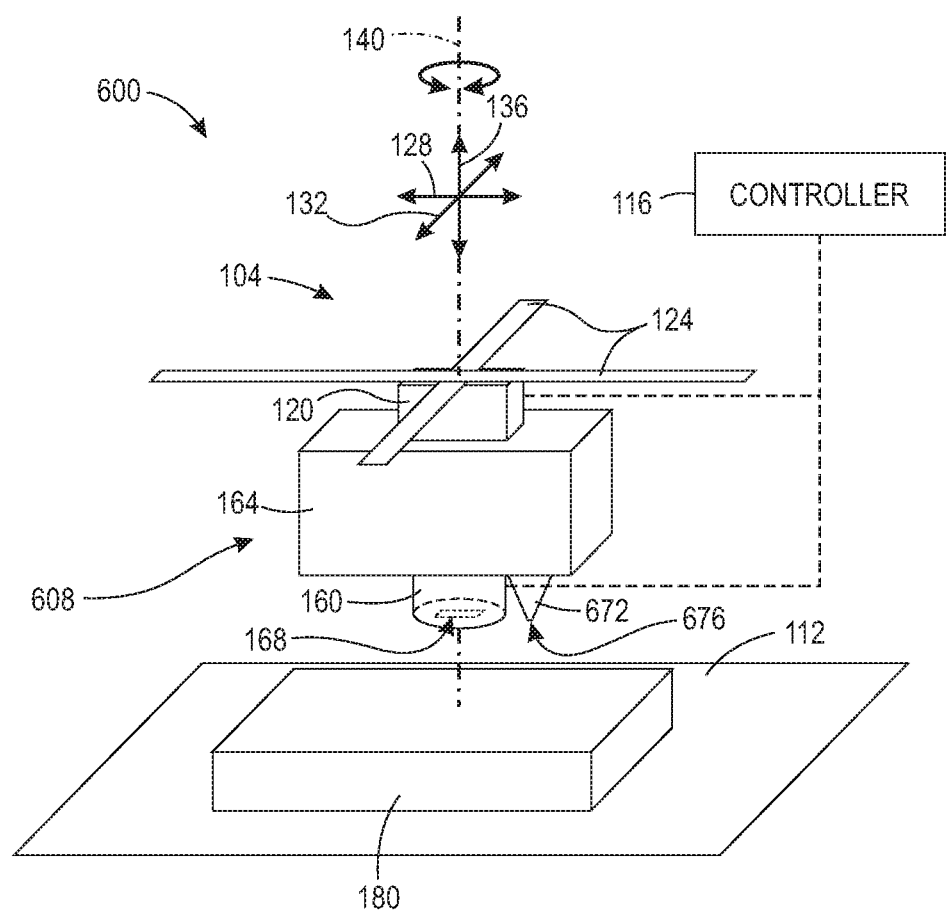
FIG. 19 illustrates a schematic view of a three-dimensional object printer having an extruder assembly including a first extruder body with an extrusion slot and a second extruder body with an extrusion nozzle.

FIG. 19 illustrates another embodiment of a three-dimensional object printer 600 that is similar to the embodiment of FIG. 1 described above. For simplicity, only the differences between the three-dimensional object printer 600 of FIG. 19 and the three-dimensional object printer 100 of FIG. 1 are illustrated herein. In the three-dimensional object printer 600, the extruder assembly 608 includes a second extruder body 672 in addition to the extruder body 160 described above. The second extruder body 672 is operatively connected to the reservoir 164 and is configured to receive the same build material from the reservoir 164 as the first extruder body 160. The second extruder body defines an extrusion nozzle 676 having a diameter that is smaller than the extrusion slot 168 of the extruder body 160.

The second extruder body 672 is operatively connected to the controller 116, which is configured to operate the first extruder body 160 to produce large objects on the build object 180 by extruding build material through the extrusion slot 168. The controller 116 is configured to operate the second extruder body 672 to extrude a small filament through the nozzle 676 to produce details and smaller objects on the build object 180. Consequently, the 3D object printer 600 can produce larger objects quickly, but retains the capability to produce small details on the build object 180.

It will be appreciated that variants of the above-disclosed and other features and functions, or alternatives thereof, may be desirably combined into many other different systems, applications or methods. Various presently unforeseen or unanticipated alternatives, modifications, variations, or improvements therein may be subsequently made by those skilled in the art, which are also intended to be encompassed by the following claims.

What is claimed is:

1. An extruder assembly for a three-dimensional object printing system comprising:
    an extruder body having an extrusion slot to enable a continuous filament of material to be extruded through the extrusion slot, the extrusion slot having a length that is at least twice a width of the extrusion slot;
    a shutter body having a face that is planar and parallel to a plane formed by the length and width of the extrusion slot, the face of the shutter body having an opening that has a length greater than the length of the extrusion slot and a width that is wider than the width of the extrusion slot, the opening in the face of the shutter body being configured to rotate about a geometric center of the extrusion slot; and
    an actuator operatively connected to the shutter body, the actuator being configured to rotate the shutter body about the center of the extrusion slot from a position where the length of the opening in the face of the shutter body is parallel to the length of the extrusion slot to a position where the length of the opening in the face of the shutter body is orthogonal to the length of the extrusion slot to close a first portion of the extrusion slot and alter a shape and a size of the filament extruded through the extrusion slot; and
    at least one actuator operatively connected to the extruder, the at least one actuator being configured to translate the extruder body in a horizontal plane and rotate the extruder body about a rotational axis.

2. The extruder assembly of claim 1, the at least one actuator further comprising:
    a first actuator configured to rotate the extruder body; and
    a second actuator configured to translate the extruder body.

3. The extruder assembly of claim 1, wherein the at least one actuator is a single actuator configured to both rotate and translate the extruder body.

4. The extruder assembly of claim 1 wherein the actuator configured to rotate the shutter body is further configured to rotate the shutter body 360° about the geometric center of the extrusion slot.

5. The extruder assembly of claim 1 further comprising:
    a reservoir operatively connected to the extruder body, the reservoir is configured to store a quantity of build material and deliver the build material to the extruder body.

6. The extruder assembly of claim 1, wherein the length of the extrusion slot is between approximately 0.75 mm and approximately 6.4 mm and the width of the extrusion slot is between approximately 0.2 mm and approximately 0.5 mm.

7. The extruder assembly of claim 1 wherein the rotational axis of the extruder body passes through the geometric center of the extrusion slot.

8. An extruder assembly for a three-dimensional object printing system comprising:
- an extruder body having an extrusion slot to enable a continuous filament of material to be extruded through the extrusion slot;
- at least one first actuator operatively connected to the extruder, the at least one first actuator being configured to translate the extruder body in a horizontal plane;
- a wedge-shaped collet having an oblique surface;
- at least one shutter body, the at least one shutter body is angled with respect to a vertical axis, which is parallel to an axis extending through a geometric center of the extrusion slot in a plane formed by a length and width of the extrusion slot, and the at least one shutter body contacts the oblique surface of the wedge-shaped collet; and
- a second actuator operatively connected to the wedge-shaped collet, the second actuator being configured to move the wedge-shaped collet along a path parallel to the vertical axis to move selectively the at least one shutter body along the oblique surface of the wedge-shaped collet so the at least one shutter body moves horizontally across the extrusion slot to close and open a first portion of the extrusion slot to reduce and increase, respectively, a width of the filament extruded through the extrusion slot.

* * * * *